(12) United States Patent
Hawkins et al.

(10) Patent No.: US 6,805,795 B2
(45) Date of Patent: Oct. 19, 2004

(54) LATCH-ASSISTED LID EXTRACTOR

(75) Inventors: Charles W. Hawkins, Sparta, TN (US);
Kevin C. South, Sparta, TN (US);
Chad M. Thomas, Jackson, TN (US)

(73) Assignee: Fleetguard, Inc., Nashville, TN (US)

( * ) Notice: Subject to any disclaimer, the term of this patent is extended or adjusted under 35 U.S.C. 154(b) by 184 days.

(21) Appl. No.: 10/164,265

(22) Filed: Jun. 5, 2002

(65) Prior Publication Data

US 2003/0226798 A1 Dec. 11, 2003

(51) Int. Cl.⁷ .......................... B01D 27/08; B01D 35/04
(52) U.S. Cl. ..................... 210/238; 210/435; 210/450; 210/451; 210/453; 220/212.5; 220/252
(58) Field of Search ............................... 210/238, 435, 210/450, 451, 453; 220/252, 254.3, 254.6, 212.5

(56) References Cited

U.S. PATENT DOCUMENTS

| | | | |
|---|---|---|---|
| 1,739,911 A | 7/1928 | McMurray | 220/314 |
| 1,929,761 A | 7/1931 | Thwaits | 220/314 |
| 3,970,213 A | 7/1976 | Clay | 220/324 |
| 4,570,816 A | 2/1986 | Ferris et al. | 220/314 |
| 5,045,200 A * | 9/1991 | Brook | 210/451 |
| 5,050,623 A | 9/1991 | Yuhara et al. | 132/301 |
| 5,198,104 A * | 3/1993 | Menyhert | 210/450 |
| 5,199,597 A | 4/1993 | Gladish | 220/715 |
| 6,217,835 B1 | 4/2001 | Riley et al. | 422/297 |

* cited by examiner

Primary Examiner—David A. Reifsnyder
(74) Attorney, Agent, or Firm—Woodard, Emhardt, Moriarty, McNett & Henry LLP

(57) ABSTRACT

The present invention relates to the latch-assisted lid extractor. The present invention includes a canister and a lid connected to the canister via a latch assembly. The latch assembly includes an over-center lock to removably secure the lid to the canister. Additionally, the latch assembly can be moved from a first position sealing the canister with the lid to a second position urging the lid away from the canister. The present invention provides a mechanism that can both securely latch or fasten a lid to a canister and at the same time assist in removing the lid from the canister to enhance ease of operation.

34 Claims, 11 Drawing Sheets

LATCH-ASSISTED LID EXTRACTOR

BACKGROUND OF THE INVENTION

The present invention is related to a latch assembly. More specifically, the present invention is directed to a latch-assisted lid extractor.

In the automobile and truck industry, replaceable fuel filters are contained in canisters which must be securely sealed to prevent the fuel from leaking. The fuel filters can be replaced during regularly-scheduled maintenance procedures or more frequently if the filters become clogged. Frequently, the lids fit tightly to the lower portion of the canister to prevent fuel leaks. It is not unusual for the lid to become "frozen" onto the canister. This makes it difficult to open the canister and replace the used filter. This job can be made more difficult because of the physical condition of the fuel canisters, which are typically round and without suitable "handles" to grip. Additionally, the canisters, which are often located in the engine compartment, become coated with oil, grease, or grime. This prevents gaining a grip on the canister to remove the tight fitting lid.

While the above problems have focused on fuel filter canisters, the same problems can be extrapolated to virtually any type of container and lid combination. This is particularly true for push-on-type lids, i.e., lids which do not screw onto (or into) the lower container. An added consideration occurs when the interior of the closed canister is pressurized. Even a slight pressure such as can be found in a fuel filter canister can cause the contents to leak or seep out if the lid doesn't seal the container. Consequently, not only must the lid close the container, it also must be tight fitting to prevent any leaks or even from being ejected because of the pressure. A locking mechanism is often required to secure the lid. A locking mechanism forces the lid onto the container and can further frustrate attempts to open the container.

Therefore, it is desirable to provide a lid that not only can be secured onto the lower portion of a canister to provide a tight, preferably leak-proof seal, but can also be readily removed when desired. In light of the above-described problems, there is a need for continued advancements in the relevant area. The present invention provides such an advancement and includes a wide variety of benefits and advantages.

SUMMARY OF THE INVENTION

The present invention relates to closure mechanisms and containers and the manufacture and use thereof. Various aspects of the invention are novel and non-obvious and provide various advantages. While the actual nature of the invention covered herein can only be determined with reference to the claims appended hereto, certain forms and features, which are characteristic of the preferred embodiments disclosed herein, are described briefly as follows.

In one form, the present invention provides an assembly that comprises a container, a lid or closure member, and a latch or closure assembly. The container comprises a wall having an exterior surface and which defines an interior chamber and an opening into the interior chamber. A closure member is provided to cover at least a portion of the opening into the interior chamber. The closure member has a recess formed therein. The closure assembly comprises a first arm pivotally mounted to the exterior surface of the container wall, and a second arm pivotally mounted to the first arm and having a closure engaging portion which is adapted to be received within the recess in the closure member. The second arm is movable from a first position securing the closure member to the container, to a second position wherein at least a portion of the closure member is spaced from the container's opening whereby movement of the second arm from the first position to the second position urges the closure member in a direction away from the container's opening. In preferred embodiments, the closure member or lid can be pivotally mounted or secured to the container to prevent displacement or loss of the closure member or lid. Additionally, the container can include two or more closure assemblies positioned about the circumference of the container. In other embodiments, the container is a circular canister or a box-type container.

In other forms, the present invention provides a canister assembly that comprises a container having a wall defining an interior chamber and an opening through the wall into the interior chamber; a closure member secured to a portion of the wall and covering at least a portion of the opening into the interior chamber; and a locking assembly comprising a first arm pivotally attached to the wall of the container and a second arm having a first end pivotally attached to the first arm and an opposite second end adapted to be releasably engaged to the closure member; and means for disengaging the closure member from the wall. In preferred embodiments, the locking assembly comprises an over-center lock mechanism.

In still other forms, the present invention provides a locking assembly for securing a first member to a second member. The locking assembly comprises a lever having a first end pivotally secured to the first member; an arm having a first end pivotally connected proximal to the first end of the lever; and a closure engaging portion adapted to be received within a recess formed in the second member. The second arm is movable from a first position securing the first member to the second member, to a second position wherein at least a portion of the first member is spaced from the second member and whereby pivotal movement of the lever moves the second arm from the first position to the second position and urges the second member away from the first member.

It is one object of the present invention to provide a latch-assisted locking assembly.

Further objects and advantages of the present invention will be apparent from the description provided below.

DETAILED DESCRIPTION OF THE INVENTION

For the purposes of promoting an understanding of the principles of the invention, reference will now be made to the embodiments illustrated herein and specific language will be used to describe the same. It will nevertheless be understood that no limitation of the scope of the invention is hereby intended. Any alterations and further modifications in the described devices, assemblies, or processes, and any further applications of the principles of the invention as described herein, are contemplated as would normally occur to one skilled in the art to which the invention relates.

In general, the present invention relates to a latch assembly that can alternatively secure a lid or cover to a container and assist in removal of that same lid or cover from the container. The latch assembly includes a pair of levers or arms that are pivotally connected together. The first arm is pivotally attached to either the container or the lid. The second arm or lever is pivotally attached to the first arm proximate to its point of attachment to the container or lid. Preferably, the latch mechanism uses the fundamentals of an over-center lock to both urge the lid onto the container and lock or secure the lid and container together. In addition, the first arm provides a significant mechanical advantage to disengage the lid from the container to facilitate removal of the lid. In one embodiment, the first and second lever or arms are attached to the container. In another embodiment, the first and/or second arms are pivotally attached to the lid.

Figure 1:
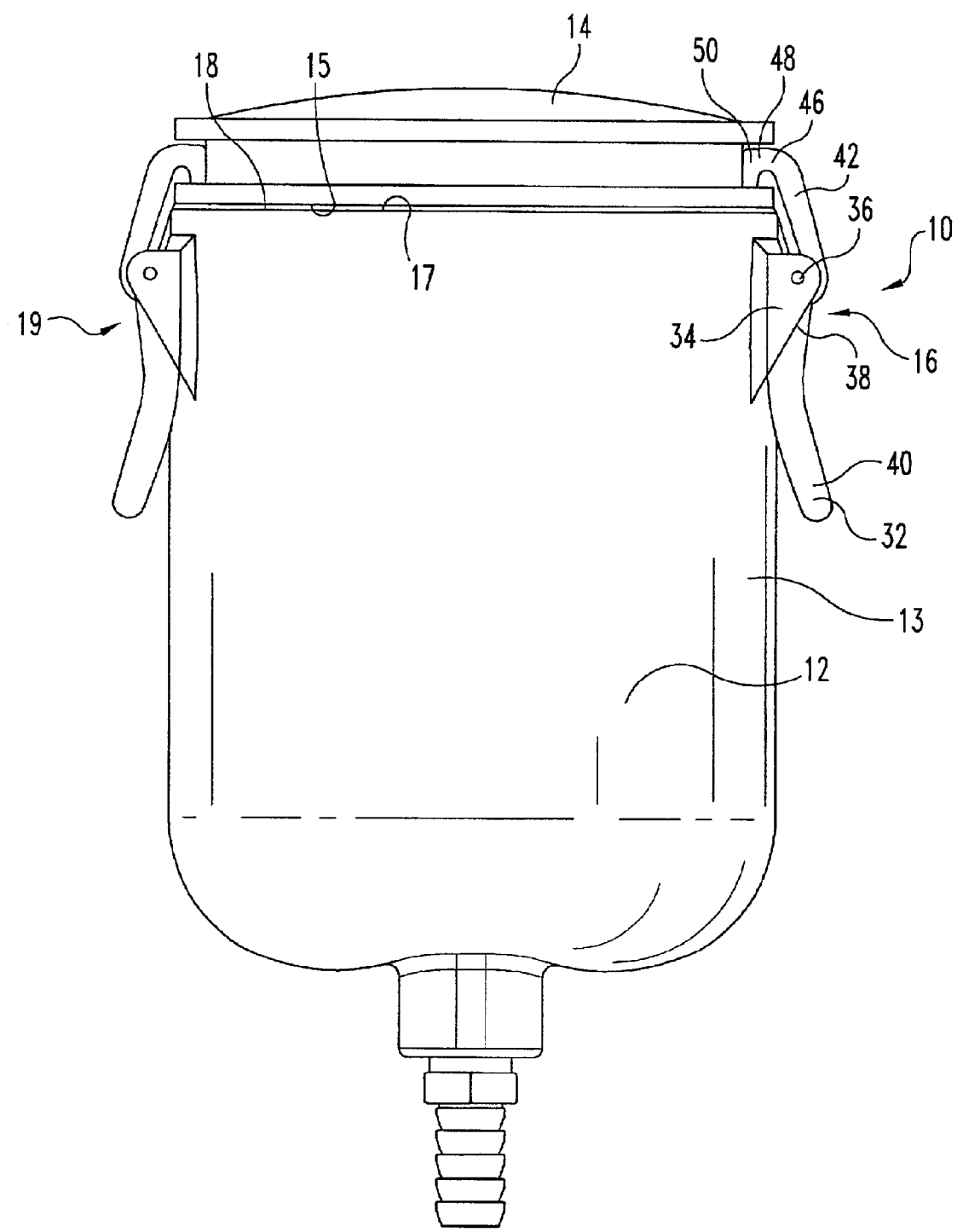
FIG. 1 is an elevated first side view of a lid, container, and latch assembly illustrated with the lid secured to the container in accordance with one embodiment of the present invention.

FIG. 1 is an elevated first side view of a fuel filter canister 10 having a latch assembly 16 in accordance with one embodiment of the present invention. Closure member or lid 14 is fully seated to open end 18 of container 12 such that lower surface 15 of lid 14 bears against the container rim 17. In the illustrated embodiment, the assembly includes two latch assemblies 16 and 19 positioned approximately diametrically opposite to each other about container 12. It will be understood by those skilled in the art that the present invention can include a single latch assembly or a plurality of latch assemblies positioned as desired about the periphery of container 12.

Figure 2:
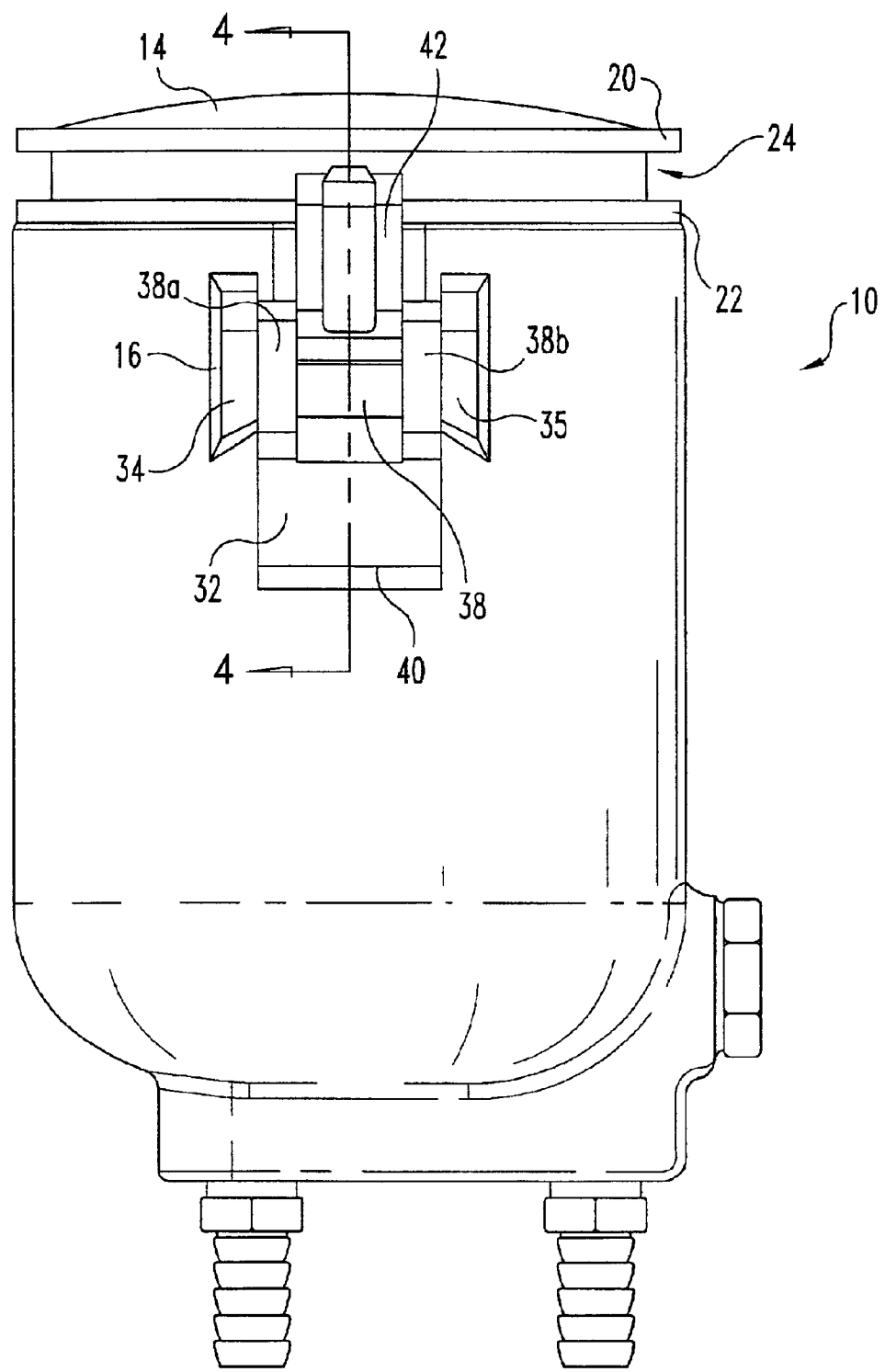
FIG. 2 is an elevated second side view of the lid, container, and latch assembly of FIG. 1.
Figure 3:
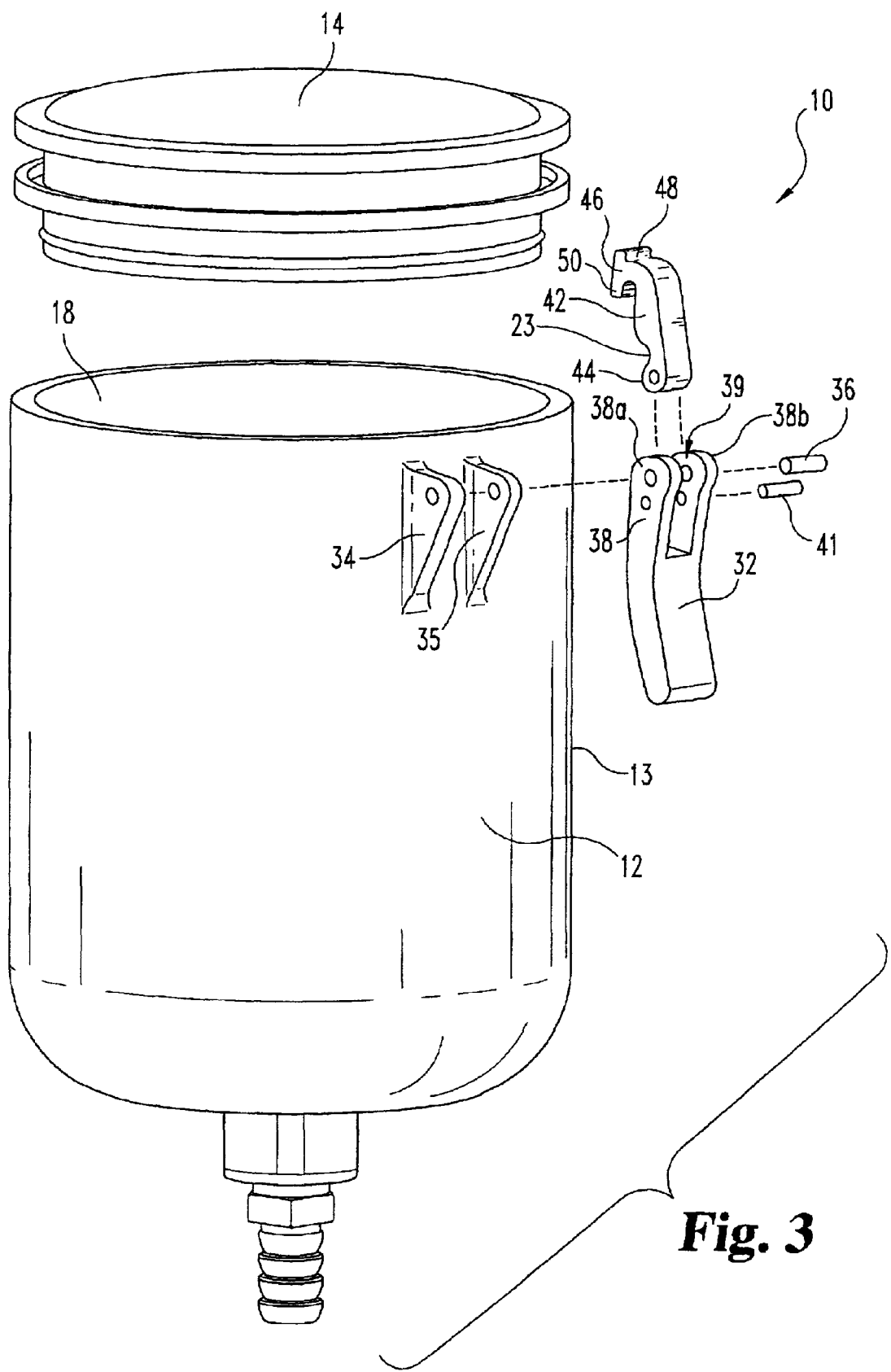
FIG. 3 is an exploded view of the lid, container, and latch assembly of FIG. 1.
Figure 4:
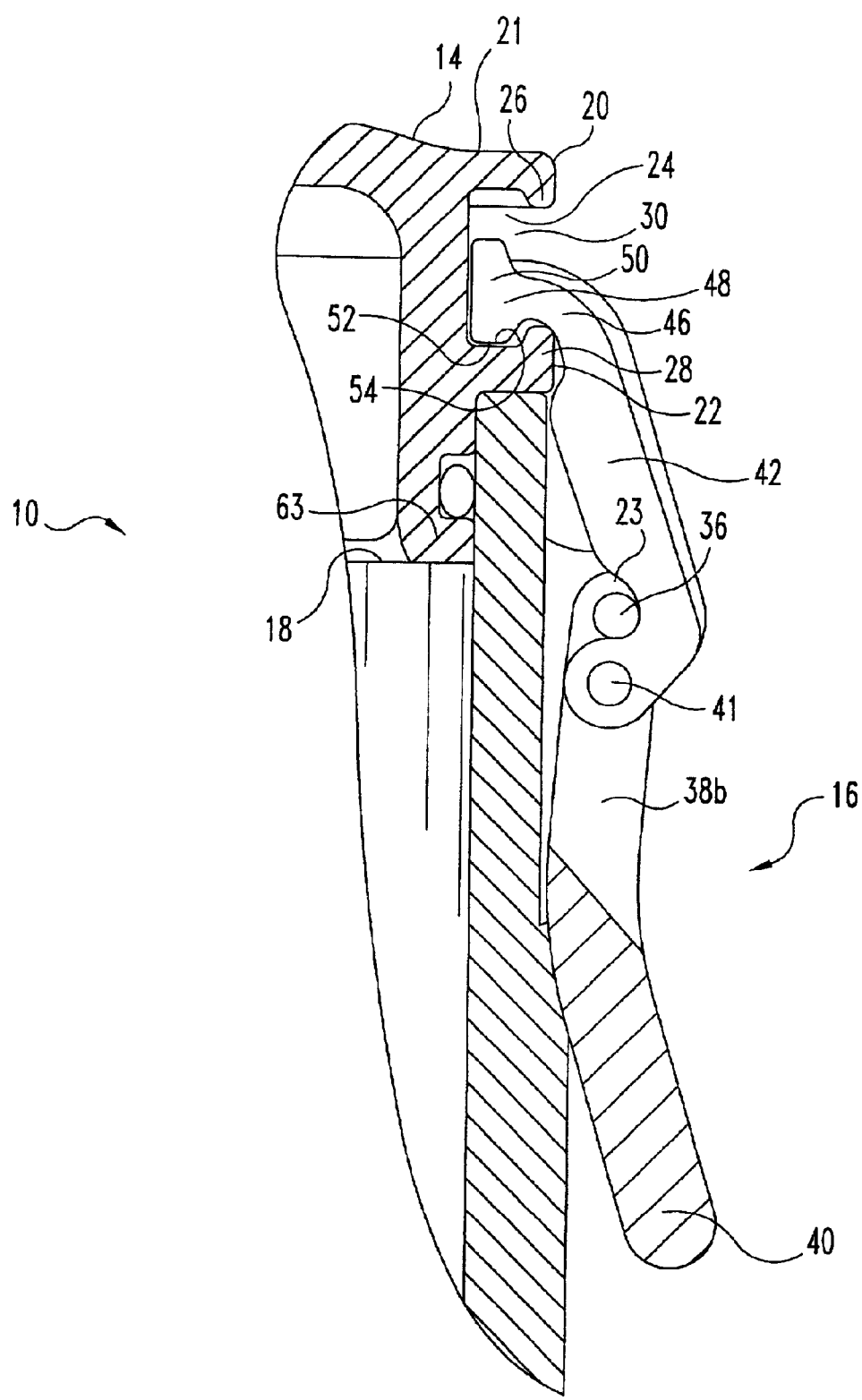
FIG. 4 is a partial view in full section along section line 4—4 of the lid, container, and latch assembly illustrated in FIG. 2.

Referring additionally to FIGS. 2, 3, and 4, alternative views of the fuel filter canister 10 are illustrated. Latch assembly 16 includes a first arm 32 pivotally mounted to wall 13 of container 12. Preferably, first arm 32 is pivotally mounted to container 12 between a pair of ears or tabs 34 and 35 extending from exterior wall 13 using pivot pin 36 extending therebetween. In preferred embodiments, first end 38 of arm 32 forks into two prongs or tines 38a and 38b defining a channel 39 therebetween. Pivot pin 36 extends from first tab 34, through an opening in first tine 38a and through an opening in second tine 38b to second tab 35.

Latch assembly 16 also includes a second arm 42 having a first end 44 pivotally connected to first end 38 of first arm 32. In preferred embodiments, first end 44 of second arm 42 is disposed in channel 39 between tines 38a and 38b. A second pivot pin 41 extends from first tine 38a through first end 44 and to second tine 38b. Preferably, first end 44 of second arm 42 includes a recess 23 to receive pivot pin 36.

Second arm 42 also includes an opposite second end 46, which terminates in a lid engaging portion 48. In preferred embodiments, lid engaging portion 48 includes a hammer-head or "T-shaped" head 50.

Referring now specifically to FIG. 4 for the illustrated embodiment, fuel filter canister 10 also includes lid 14 to close opening 18. Upper flange 20 and a second or lower flange 22 both extend about the outer circumferential perimeter of lid 14. Upper flange 20 and lower flange 22 define a recess, for example, channel or groove 24 therebetween. Upper flange 20 terminates in an "L-shaped" lip or rim 26. Similarly, lower flange 22 terminates in a corresponding mirror image "L-shaped" lip or rim 28. Together, "L-shaped" lips 26 and 28 define an opening 30 into groove 24. In one preferred embodiment, opening 30 defines the minimum width of groove 24. Groove 24 is provided to receive lid engaging portion 48 of second arm 42.

In the illustrated embodiment, upper and lower flanges 20 and 22, and consequently groove 24, circumscribe lid edge 21. This provides advantages in that the lid can be indiscriminately rotated and fixed or secured to cover open end 18 of container 12.

In other embodiments it will be understood that upper and lower flanges 20 and 22 (and consequently groove 24) need not completely circumscribe lid edge 21 but can be provided in selected locations about lid edge 21 as desired.

In the illustrated embodiment, "T-shaped" head 50 is disposed within groove 24, such that a first, lower bearing surface 52 bears against inner wall 54 of lower flange 22 to urge lid 14 over opening 18 of container 12. Lower flange 22, in conjunction with "L-shaped" lip 28, inhibits "T-shaped" head 50 from slipping out of groove 24.

Figure 5:
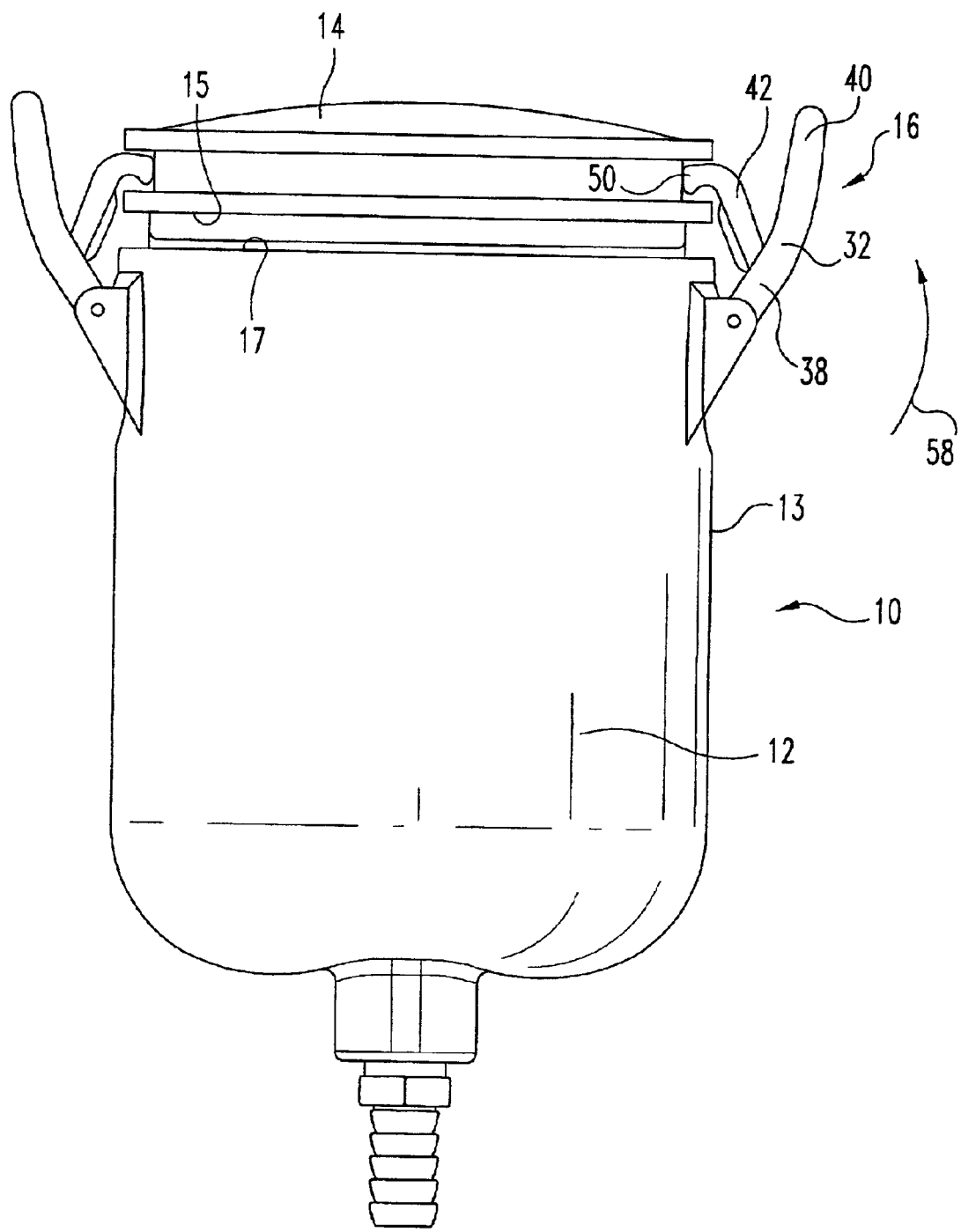
FIG. 5 is an elevated first side view of the lid, container, and latch assembly of FIG. 1 illustrated with the lid partially displaced from the container.
Figure 6:
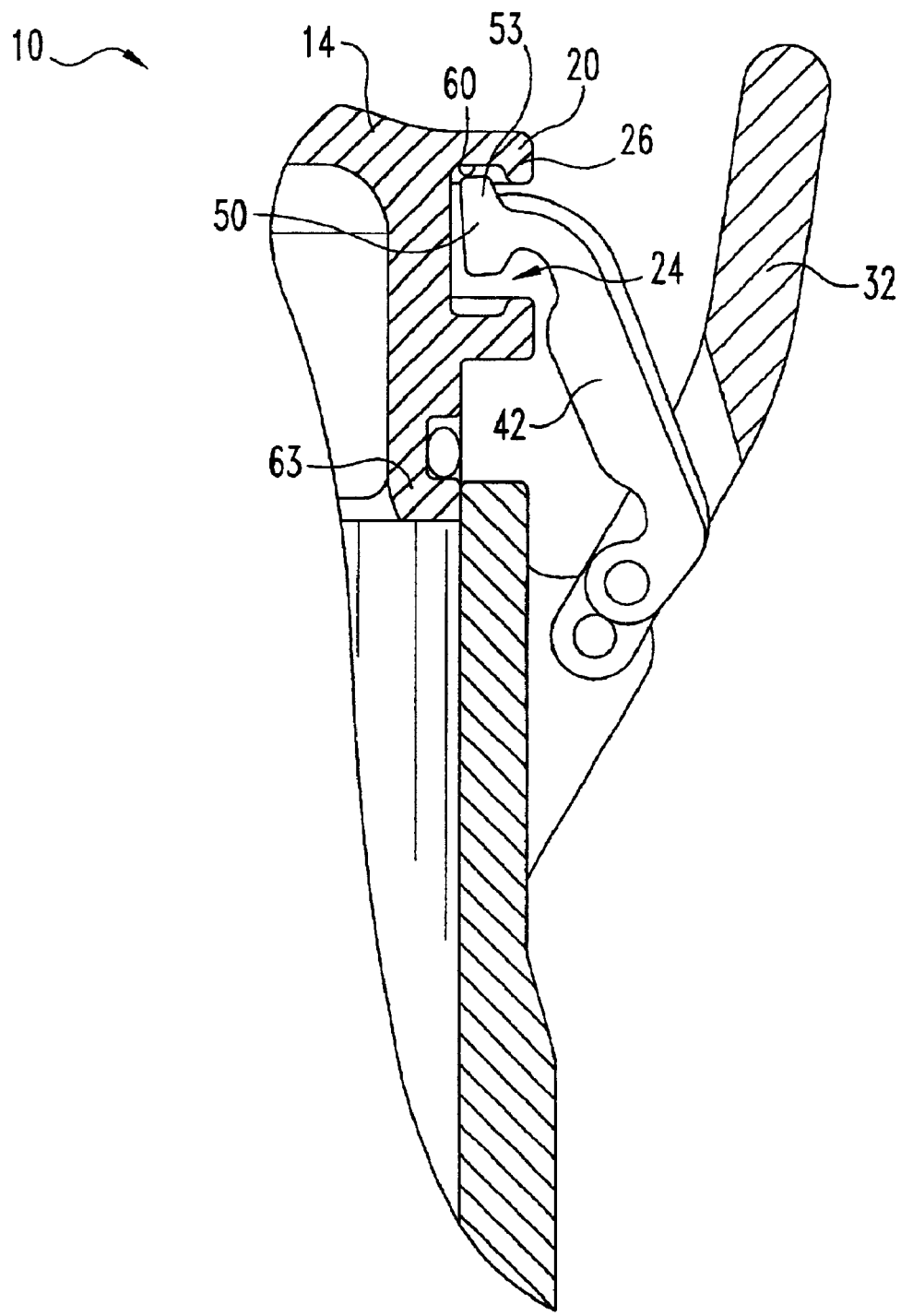
FIG. 6 is a partial view in full section of the lid, container, and latch assembly illustrated in FIG. 5.

FIGS. 5 and 6 illustrate fuel filter canister 10 having lid 14 displaced from a container 12 such that lower surface 15 is spaced from rim 17. Latch assembly 16 assists in separating or extracting lid 14 from container 12. First arm 32 extends from container 12 such that second end 40 is spaced from wall 13. Second arm 42 extends from first end 38 to lid 14. "T-shaped" head 50 is still disposed within groove 34. However, now second, upper bearing surface 53 bears against inner wall portion 60 of groove 24. Upper, "L-shaped" lip 26 in conjunction with upper flange 20 inhibits disengagement of "T-shaped" head 50 from groove 24.

In use, first arm 32 is positioned in a first position as illustrated in FIGS. 1–4 to secure or lock lid 14 to the container. Pivoting first arm 32 about pivot pin 36 in a direction illustrated by arrow 58 (shown in FIG. 5) assists in removing lid 14 from container 12. Second end 46 of second arm follows pivot pin 36 and releases the over-center-lock mechanism. This movement also forces second arm 42 to move such that "T-shaped head 50 moves in a substantially vertical direction while still retained within groove 24. Consequently, "T-shaped" head 50 disengages from inner wall portion 54 of groove 24 and bears against opposite wall portion 60 of groove 24 to urge lid 14 to move in a vertical direction from container 12.

It can be seen from the illustrated embodiment that the first arm 32 acts as a lever and provides significant mechanical advantage to urge lid 14 to disengage from the interior of container 12. This provides particular advantages to release snug-fitting lids which are designed to provide a leak-free and tight seal between the lid 14 and container 12.

In preferred embodiments, the movement in a direction illustrated by arrow 58 provides significant vertical advancement of lid 14 to sufficiently enable one with relative ease to completely separate lid 14 from container 12. In the illustrated embodiment, it can be seen that the lower portion 63 of lid 14 is still engaged with the interior of container 12. In alternative embodiments, pivotal movement of first arm 32 provides sufficient vertical movement of lid 14 to completely disengage or separate the lid 14 from container 12. This can be accomplished by adjusting the length of first arm 32 and/or second arm 42 and/or adjusting the position for pivotal attachment of second arm 42 to first arm 32.

It should be understood by one skilled in the art that lid 14 can be adapted to fit over open end 18 of container 12 rather than engaging with the interior of container 12. Furthermore, the lid can be hinged to a portion of the latch and/or otherwise interconnected to container 12 to prevent complete separation of lid 14 from container 12 and still provide sufficient access into the interior of container 12. (See for example FIG. 8.) This provides advantages in that lid 14 cannot be misplaced or lost during operation.

Figure 7:
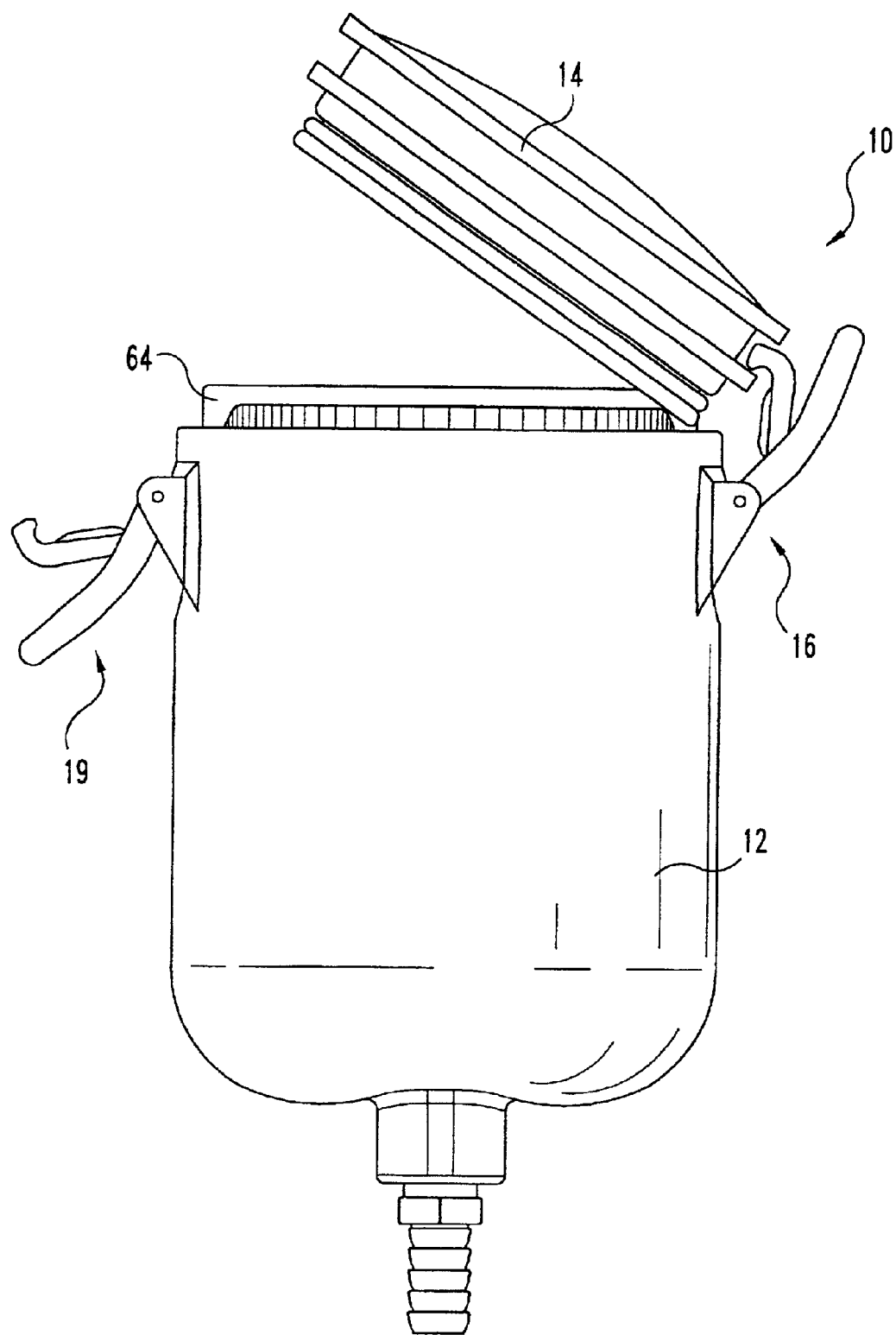
FIG. 7 is an elevated first side view of the lid, container, and latch assembly of FIG. 1 with the lid removed from the container in accordance with the present invention.

Referring additionally to FIG. 7, it can be seen that after removal of lid 14 from container 12, one or more of latch assemblies 16 can be disengaged from the lid. For example, latch assembly 19 is disengaged from groove 24 while latch assembly 16 remains engaged with groove 24. Latch assembly 16 can allow sufficient movement of lid 14 to allow complete access into interior chamber 62 to allow for the removal and replacement of a filter 64. Filter 64 is illustrated as a fuel filter. However, it would be understood by those skilled in the art that any number of filters or other objects can be inserted into a container 12, e.g., a filter such as an oil filter, air filter, and/or coolant filter. Furthermore, container 12 can be provide in a variety of shapes, preferably provided to conform to the exterior dimensions and shape of the included filter.

Figure 8:
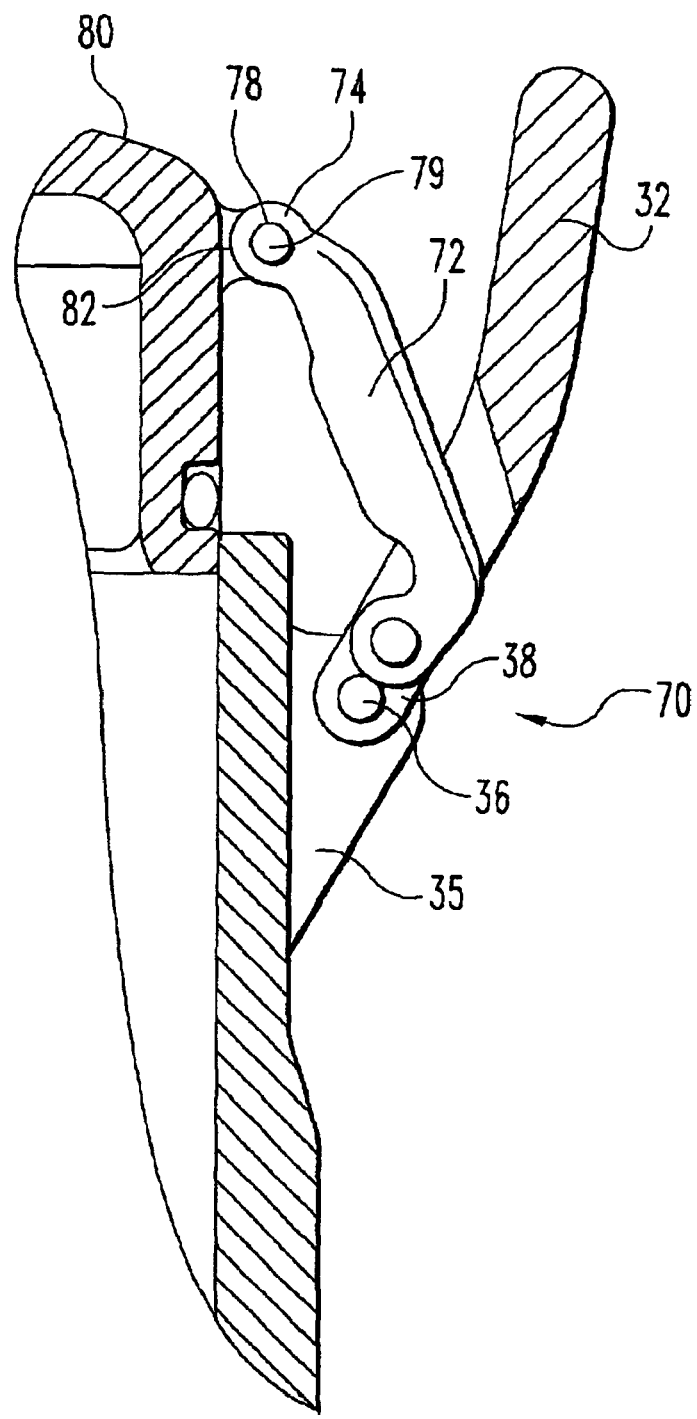
FIG. 8 is a partial view in full section of an alternative embodiment of a latch assembly pivotally interconnected to a lid and a container in accordance with the present invention.

FIG. 8 is a partial view in full section of an alternative embodiment of a latch assembly 70 for use in the present invention. Latch assembly 70 is formed similarly to latch assembly 16 and like reference numbers will be used to denote like components. FIG. 8 illustrates an alternative embodiment of the present invention where lid 80 can be fixed to a portion of latch assembly 70, which can act as a hinge to inhibit complete separation of lid 80 from container 12. Latch assembly 70 includes first arm 32 pivotally mounted via pivot pin 36 to a pair of tabs 34 and 35. Second arm 72 is pivotally mounted to a first end 38 of first arm 32. Opposite end 74 can include an opening 78. Lid 80 includes at least one projection 82 preferably providing a pair of projections (similar to tabs 34 and 35) having an opening therethrough. Pivot pin 79 extends from projection 82 through opening 78 pivotally connecting arm 72 to lid 80. Assembly 70 can also include one or more latch assemblies such as described above for latch assembly 16 to secure and extract lid 80 from container 12.

Figure 9:
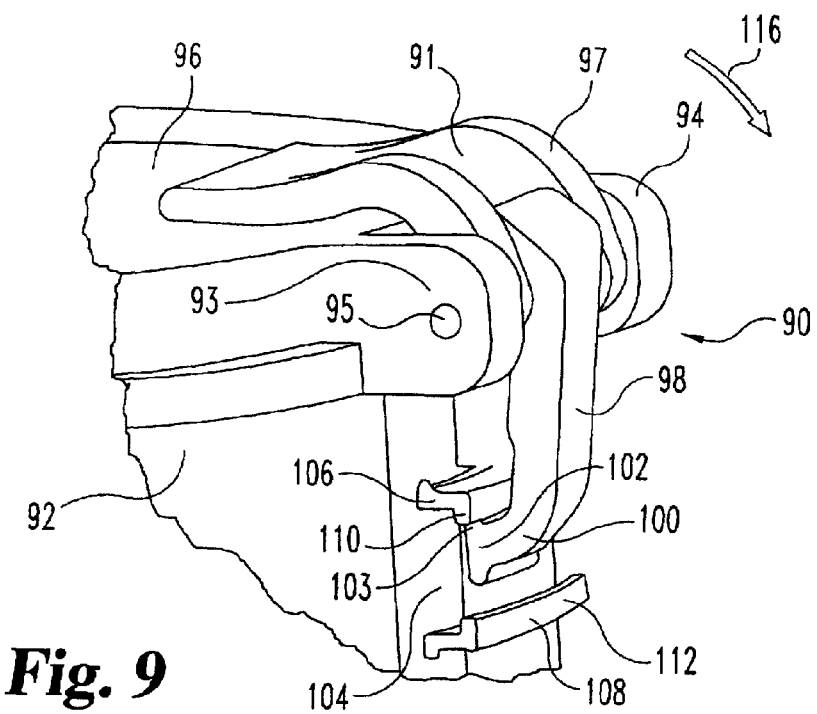
FIG. 9 is a partial view of yet another embodiment of a lid, container, and latch assembly pivotally attached to the lid in accordance with the present invention.

FIG. 9 illustrates yet another embodiment of a latch assembly 90 for use with lid 96 and container 92 according to the present invention. Latch assembly 90 includes a first arm 91 pivotally attached to a pair of tabs 93 and 94 via pivot pin 95. First arm 91 overlays a portion of lid 96. Second arm 98 is pivotally attached to a first end 97 of first arm 91. Second arm 98 is pivotally connected to first arm 91 to provide an over-center lock mechanism. Opposite end 100 of second arm 98 includes the engaging portion 102. Engaging portion 102 was provided as a "T-shaped" head 103 to be received within a groove 104 formed by upper and lower flanges 106 and 108, respectively. Upper flange 106 includes an "L-shaped" lip 110, while lower flange 108 also includes a similar, but mirror image, "L-shaped" lip 112. "L-shaped" lips 110 and 112 define the opening into groove 104 formed therebetween. In preferred embodiments, "T-shaped" head 103 has a maximum dimension sized smaller than the width of opening 114.

Figure 10:
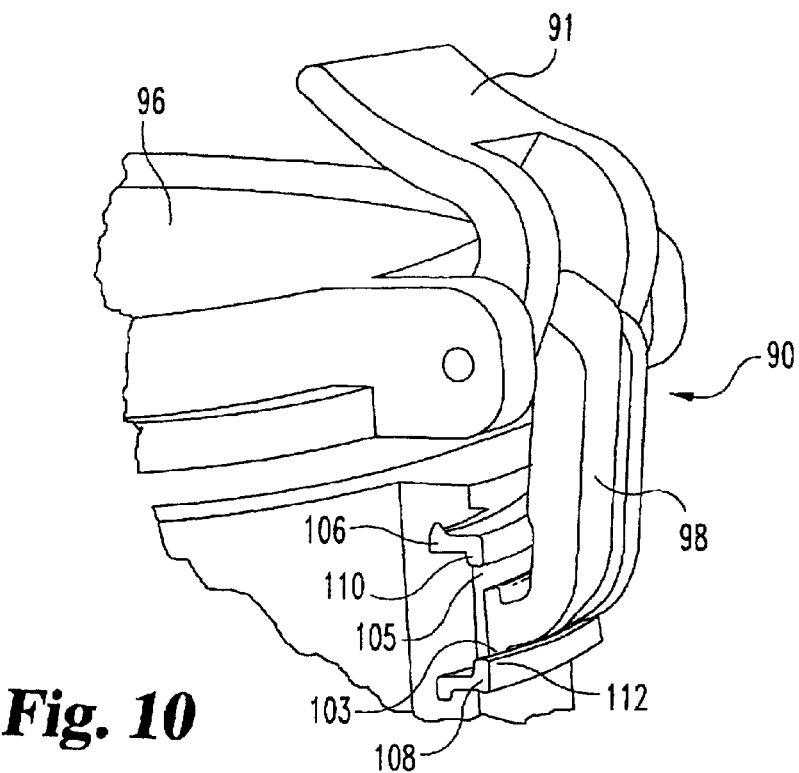
FIG. 10 is a partial view of the lid, container, and latch assembly of FIG. 9 with the lid partially displaced from the container in accordance with the present invention.

FIG. 10 illustrates latch assembly 90 with lid 96 displaced from container 92. First arm 91 extends from lid 96 at an oblique angle. Second arm 98 bears against lower flange 108.

In effect, latch assembly 90 is substantially the reverse of latch assembly 16 in that first and second arms are pivotally connected respectively to the lid 96 while the groove 104 is formed in or about container 92. As with canister 10, container 92 and lid 96 can include two or more latch assemblies positioned as desired.

Movement of first arm 91 from a first position (illustrated in FIG. 9) to a second position (illustrated in FIG. 10) in a direction illustrated by arrow 116 about pivot pin 95 acts as a lever to move second arm 98 in a substantially vertical direction whereby a lower portion of "T-shaped" head 103 bears against the inner wall of lower flange 108. This in turn forces lid 96 in a vertical direction from container 92.

Figure 11:
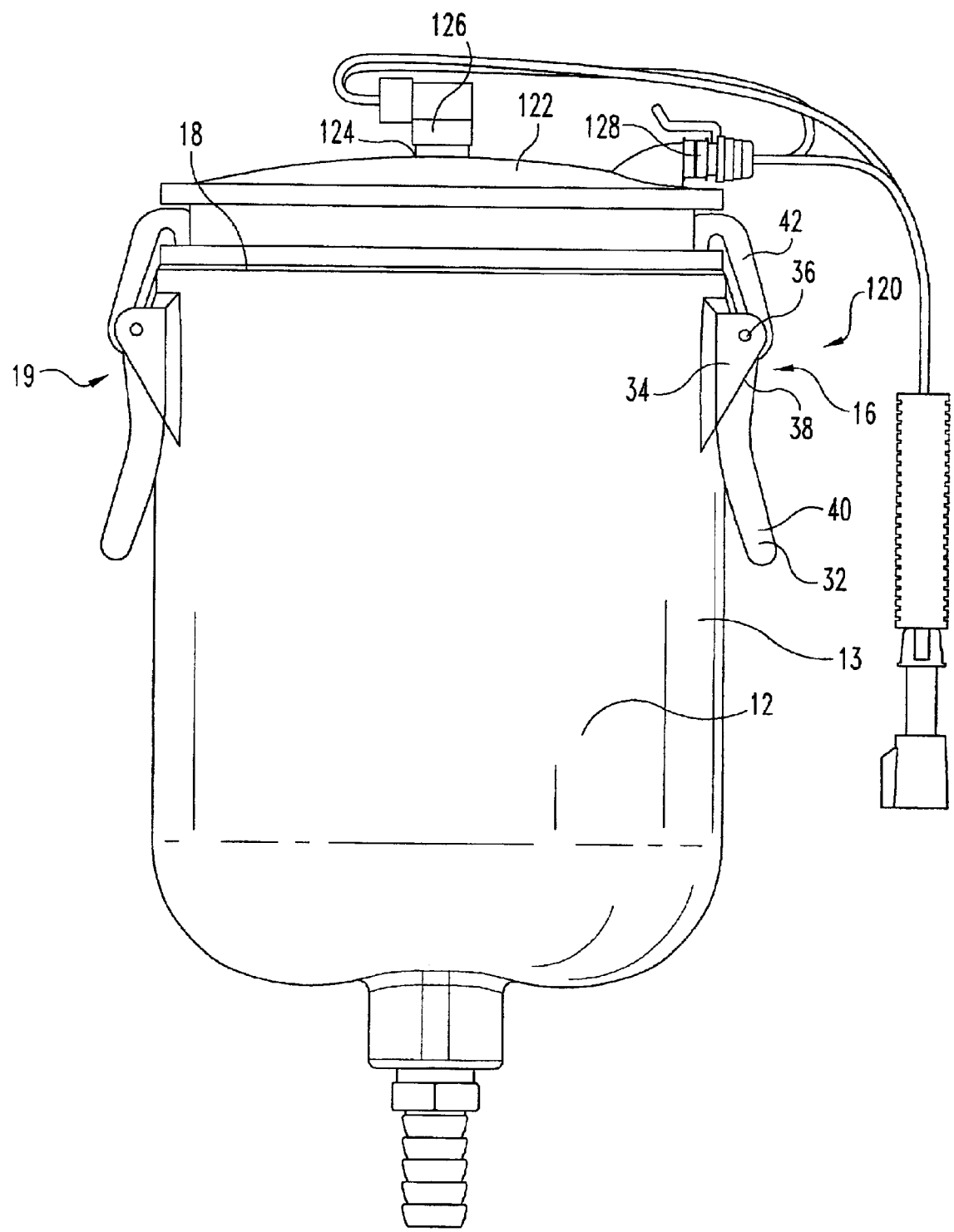
FIG. 11 is an elevated first side view of a lid, container, and latch assembly with an electrical connection in accordance with another embodiment of the present invention.

FIG. 11 is yet another embodiment of a canister 120 having a latch assembly 16 according to the present invention. Canister 120 is formed similarly to canister 10 and the same reference numbers will be used for similar components. Canister 120 includes a lid 122 having an electrical connection 124 to an electrical plug 126. As illustrated, lid 122 also includes a second electrical connection 128. It will be understood that lid 122 can include one, two, or more electrical connections as desired. In this embodiment, particular advantages can be gained by providing canister 120 with a "push-on" lid 122 instead of a "screw-on" type lid to avoid removing or alternatively twisting and/or entangling of the wires that can occur with a screw-on type lid.

Figure 12:
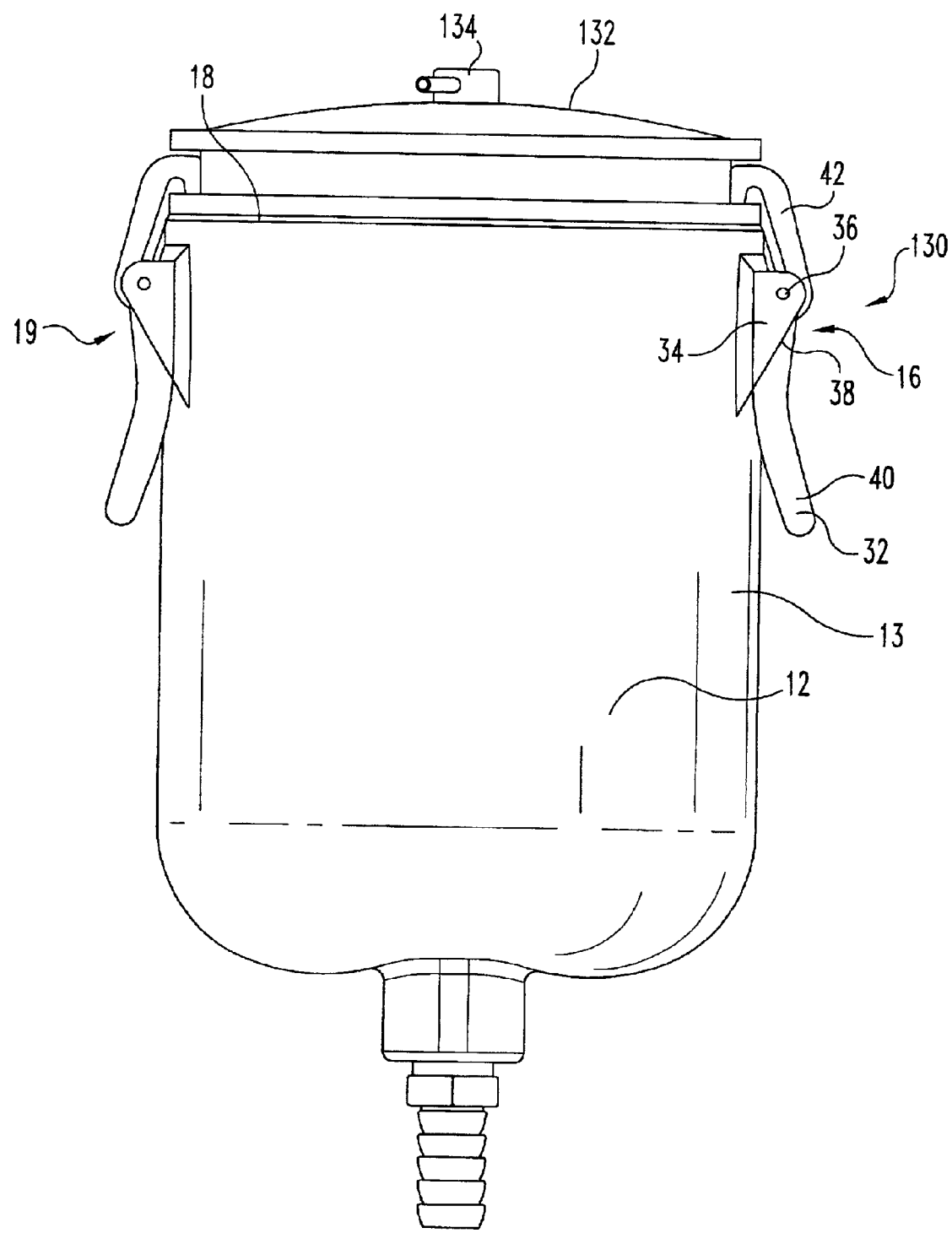
FIG. 12 is an elevated first side view of a lid, container, and latch assembly with a fluid connection in accordance with yet another embodiment of the present invention.

FIG. 12 is still yet another embodiment of a canister 130 according to the present invention. Canister 130 is formed similarly to canister 10 and the same reference numbers will be used for similar components. Lid 132 includes a fluid connection 134. Connection 134 is a general connector that can be used to connect a fluid line such as a line for gas, oil (lubricants), water, and the like. Alternatively, connection 134 can be used to connect a gaseous line either for an air line or a vacuum line as desired.

The various embodiments of a container, lid, and latch assembly are described in the present application. It will be understood by those skilled in the art that a selected embodiment of the present invention can include any of the portions, structures, or assemblies described for the other embodiments of the present invention. Additionally, while the above description specifically refers to fuel filter canisters, the invention is not so restricted and includes air, lube, oil, centrifuge applications and, generally, any container and lid combination.

The present invention also contemplates modifications as would occur to those skilled in the art. It is also contemplated that processes embodied in the present invention can be altered, rearranged, substituted, deleted, duplicated, combined, or added to other processes as would occur to those skilled in the art without departing from the spirit of the present invention. Further, any theory of operation, proof, or finding stated herein is meant to further enhance understanding of the present invention and is not intended to make the scope of the present invention dependent upon such theory, proof, or finding.

While the invention has been illustrated and described in detail in the drawings and foregoing description, the same is considered to be illustrative and not restrictive in character, it is understood that only the preferred embodiments have been shown and described and that all changes and modifications that come within the spirit of the invention are desired to be protected.

What is claimed is:

1. An assembly comprising:
   a container comprising a wall having an exterior surface and defining an interior chamber, said container having an opening into said interior chamber;
   a closure member secured to the container covering at least a portion of the opening, said closure member having a recess therein; and
   a closure assembly comprising a first arm pivotally mounted on the exterior surface of the wall, and a second arm pivotally connected to the first arm and having an engaging portion adapted to be received within said recess of said closure member, said second arm movable from a first position securing the closure member to the container to a second position wherein at least a portion of the closure member is spaced from the container and whereby movement of the second an from the first position to the second position urges the closure member away from the container.

2. The assembly of claim 1 comprising a projection extending from the exeterior surface, wherein said first member is pivotally mounted on said projection.

3. The assembly of claim 1 wherein said closure member is detachable from said container.

4. The assembly of claim 3 wherein the engaging portion of the second arm is removable from the recess.

5. The assembly of claim 1 wherein said closure member is pivotally mounted to said container.

6. The assembly of claim 1 wherein said first arm provides a mechanical advantage to extract said closure member from said opening.

7. The assembly of claim 1 wherein said first arm provides a mechanical advantage to move the second arm from the first position to the second position.

8. The assembly of claim 1 wherein said closure member comprises a portion adapted to be slidably received within said opening.

9. The assembly of claim 1 wherein said closure member comprises a scaling member.

10. The assembly of claim 1 wherein the container comprises a first end adjacent said opening and the closure member defines an endcap having a recess for receipt of the first end.

11. The assembly of claim 10 wherein said closure member comprises a sealing member.

12. The assembly of claim 1 comprising securing means for locking said closure member to said canister.

13. The assembly of claim 12 wherein said securing means comprises an over-center lock.

14. The assembly of claim 1 wherein movement of the second arm from the first position to the second position urges the closure member away from the container in a linear direction.

15. The assembly of claim 1 wherein said container comprises a filter.

16. The assembly of claim 15 wherein the filter is a fuel filter, an air filter, a centrifuge filter, or an oil filter.

17. The assembly of claim 1 where said container and closure member define a fuel filter housing, an air filter housing, an oil filter housing, or a centrifuge housing.

18. The assembly of claim 1 comprising two or more closure assemblies.

19. The assembly of claim 1 comprising a second closure assembly including a third arm pivotally mounted to the exterior surface of the wall, and a fourth arm pivotally connected to the third arm and movable from a first position to a second position, said second arm having a closure engaging portion fixedly secured to said closure member.

20. The assembly of claim 19 wherein movement of the third arm from the first position to the second position urges the closure member away from the container in a linear direction.

21. The assembly of claim 1 wherein said closure member comprises an outer peripheral wall portion and said recess defines a groove extending about peripheral wall portion.

22. The assembly of claim 21 wherein said peripheral wall portion includes an opening into said groove having a minimum width less than a maximum width of said groove.

23. The assembly of claim 1 whereby movement of the second arm from the second position to the first position urges the closure member into engagement with the container.

24. The assembly of claim 1 wherein said closure member includes an electrical connection, a fluid connection, or a gaseous connection.

25. A canister assembly comprising:
    a container having a wall defining an interior chamber and an opening through the wall into the interior chamber;
    a closure member secured to a portion of said wall covering at least a portion of the opening;
    a lacking assembly comprising a first arm pivotally attached to said wall and a second arm having a first end pivotally attached to said first arm and a second end adapted to be releasably engaged to said closure member; and
    means for urging said closure member away from said wall.

26. The assembly of claim 25 wherein said first end of the second arm comprises an over-center lock.

27. The assembly of claim 25 wherein said closure member includes an electrical connection, a fluid connection, or a gaseous connection.

28. The assembly of claim 25 where said container and closure member define a fuel filter housing, an air filter housing, an oil filter housing, or a centrifuge housing.

29. The assembly of claim 25 wherein movement of the first arm urges the closure member away from the container in a linear direction.

30. A canister assembly comprising:
    a container comprising a wall defining an interior chamber and an opening into the interior chamber;
    a closure member secured to a portion of said wall covering at least a portion of the opening; and
    a locking assembly comprising a first arm pivotally attached to said wall and a second arm pivotally attached to said first arm, said second arm releasably engaged to said closure member; and
    means for urging said closure member to move in a substantially linear direction away from said wall portion.

31. A locking assembly for securing a first member to a second member, said locking assembly comprising:

a lever having a first end pivotally secured to the first member;

an arm having a first end pivotally connected proximal to the first end of the lever and a closure engaging portion adapted to be received within a recess formed in the second member, said arm movable from a first position securing the first member to the second member to a second position wherein at least a portion of the first member is spaced from the second member whereby pivotal movement of the lever moves the arm from the first position to the second position and urges the second member away from the first member.

32. A method of extracting a lid from a container with a latching assembly comprising a first arm pivotally mounted to a first one of the container or lid; and having a first end, and second arm pivotally interconnected to the first end of said latch assembly adapted to latch the lid to the container, said method comprising:

releasably securing an opposite, second end of the second arm to the other of the container or lid; and pivoting the first arm in a first direction to urge the other of the container or lid in a direction away from first one of the container or lid.

33. The method of claim 32 comprising pivoting said first arm in a second direction to urge the other of the lid or container in a direction toward the first one of the container or lid.

34. The method of claim 32 comprising releasing said other of the container or lid from the second arm.

* * * * *

UNITED STATES PATENT AND TRADEMARK OFFICE
CERTIFICATE OF CORRECTION

PATENT NO. : 6,805,795 B2
DATED : October 19, 2004
INVENTOR(S) : Hawkins et al.

It is certified that error appears in the above-identified patent and that said Letters Patent is hereby corrected as shown below:

Title page,
Item [56], References Cited, OTHER PUBLICATIONS, please add:
-- http:/www.grolsch.com/pix/anim_verpakkingen4.gif"

Column 7,
Line 53, please change "comprises a scaling member" to -- comprises a sealing member --

Column 8,
Line 38, please change "a lacking assembly comprising" to -- a locking assembly comprising --

Signed and Sealed this

First Day of February, 2005

JON W. DUDAS
*Director of the United States Patent and Trademark Office*